United States Patent Office 3,019,269
Patented Jan. 30, 1962

3,019,269
STABILISATION OF PHENOLS
Harry Clough, Norton-on-Tees, England, assignor to Imperial Chemical Industries Limited, London, England, a corporation of Great Britain
No Drawing. Filed June 25, 1957, Ser. No. 667,970
Claims priority, application Great Britain July 6, 1956
1 Claim. (Cl. 260—620)

This invention relates to the stabilisation of phenols.

Many phenols are susceptible to oxidation, for example, by exposure to the atmosphere, which can cause the formation of objectionable odour and colour. We have found that this process can be inhibited by treating the phenol with a surface-active agent.

According to the present invention therefore there is provided a composition of matter which comprises at least one phenol which is susceptible to atmospheric oxiration resulting in discoloration and/or objectionable odour, and at least one surface-active agent.

Also according to the present invention there is provided a process for the stabilisation of a phenol of the kind described, in which the said phenol is treated with at least one surface-active agent.

The proportion of surface-active agent in compositions of the present invention is not critical; suitable proportions in a composition are, for example, between 0.1% and 20% by weight of the phenol present in the composition.

The surface-active agents which may be used in the present invention may be cationic, for example cetyl pyridinium bromide; anionic, for example sodium dodecylbenzenesulphonate; or nonionic, for example the product obtained by condensing a mixture of octyl cresols with ethylene oxide.

Suitable phenols which may be used in the present invention include, for example, phenol itself, phenyl phenols, cresols, xylenols, their further alkylated derivatives and mixtures of these compounds.

It is a feature of the present invention that the stabilising compound may be treated with the phenol at any convenient stage in the course of the manufacture of the phenol, for example during its recrystallisation, or during a washing process applied to the phenol. It is convenient to add the surface-active agent in the form of an aqueous or alcoholic solution.

The following examples illustrate the application of the present invention to the stabilisation of 4-methyl-2, 6-di-tert.-butylphenol.

EXAMPLE 1

In this example seven tests were carried out. In tests 1 to 5, 270 grams of the crude liquid phenol were mixed with 510 mls. of methanol. The solid phenol was precipitated from this mixture by the addition at 15° C. of 90 mls. of water, with constant stirring. In tests 3, 4 and 5, a surface-active agent according to the invention was added to the methanol-phenol mixture.

In tests 6 and 7, 400 grams of the crude phenol were mixed at 60° C. with 400 mls. of a mixture of 85 volumes of isopropanol and 15 volumes of water, and the solid phenol precipitated by cooling to room temperature, with constant stirring. Each of the two batches was then slurried with ⅓ of its weight of a mixture of 85 volumes of isopropanol and 15 volume of water, but in test 7 this mixture also contained the surface-active agent. The solid phenol was again separated in a centrifuge.

The batch of solid phenol from each of the 7 tests was predominantly 4-methyl-2, 6-di-tert.-butylphenol, and was dried and then stored at 50° C. in the dark in porcelain dishes covered by clock glasses. The colour of each sample was determined as follows.

A 1″ Lovibond cell was filled with a molten sample, and the colour was determined, using red and yellow slides, from the formula:

$$C = Y + 3R$$

where $C$=colour of sample, and $Y$ and $R$ are respectively the yellow and red units required to match the sample. (See "Standard Methods of Testing Tar and its Products," published by the Standardisation of Tar Products Tests Committee, London, 3rd edition, 1950, page 214.)

The results of the tests carried out in this example are given in Table 1, in which the additive concentration is given as weight percentage of precipitated phenol.

Table 1
[Stabilisation of 4-methyl-2, 6-di-tert.-butylphenol]

| Test | Additive | Additive Type | Additive Concn. Percent | Colour |||
|---|---|---|---|---|---|---|
| | | | | Initial | After 2 weeks | After 7 weeks |
| 1 | Nil | | | 2.8 | 36.6 | 60.7 |
| 2 | Nil | | | 3.1 | 29.6 | 45.0 |
| 3 | Octyl cresol-ethylene oxide product. | Nonionic | 4.5 | 2.8 | 2.2 | 7.9 |
| 4 | Sodium dodecyl benzene sulphonate. | Anionic | 0.35 | 2.9 | 11.2 | 10.8 |
| 5 | Sodium dodecyl benzene. | do | 3.5 | 6.0 | 5.7 | 11.6 |

| | | | | | After 4 weeks | |
|---|---|---|---|---|---|---|
| 6 | Nil | | | 1.2 | 18.9 | 33.0 |
| 7 | Cetyl pyridinium bromide. | Cationic | 0.035 | 1.0 | 8.9 | 13.5 |

EXAMPLE 2

This example shows the effect of precipitating and and also of washing 4-methyl-2, 6-di-tert.-butylphenol in the presence of a surface-active agent. Two batches A and B of crude 4-methyl-2, 6-di-tert.-butylphenol were precipitated by adding 270 mls. of water to each of two portions of 810 grams of phenols mixed with 1530 mls. of methanol. Batch B was precipitated in this way in the presence of 1.8 grams of sodium lauryl sulphate, but this surface-active agent was absent during the precipitation of Batch A. Each batch was divided into three parts a, b, and c. Each part a was washed with 600 ml. of an 85% methanol; 15% water mixture containing 0.1 gram of sodium lauryl sulphate per 100 mls. of aqueous methanol. Each part b was washed similarly, but without the sodium lauryl sulphate. Each part c was not washed. Each part was dried and stored at 50° C. in the dark, in porcelain dishes covered with clock glasses. Colour tests were carried out on the samples as described in Example 1. The results of these tests are given in Table 2.

Table 2
[Effect of precipitating and washing 4-methyl-2, 6-di-tert.-butyl-phenol in the presence of sodium lauryl sulphate]

| Run | Additive present in precipitant | Product washed | Additive present in washing | Colour ||
|---|---|---|---|---|---|
| | | | | Initial | Colour after 5 weeks at 50° C. |
| Aa | No | Yes | Yes | 2.8 | 34.9 |
| Ab | No | Yes | No | 2.0 | 38.6 |
| Ac | No | No | No | 2.3 | 41.4 |
| Ba | Yes | Yes | Yes | 2.3 | 13.8 |
| Bb | Yes | Yes | No | 2.0 | 27.8 |
| Bc | Yes | No | No | 2.0 | 34.2 |

It will be seen from Table 2 that in all cases the contact of 4-methyl-2, 6-di-tert.-phenol with sodium lauryl sulphate is beneficial to its colour stability. Of the two methods of doing this which were tested, precipitation of the phenol in the presence of the surface-active agent is more effective than washing alone. The best results were obtained by combining the two methods.

I claim:

A composition of matter consisting essentially of (1) at least one air-oxidizable phenol selected from the group consisting of phenol, unsubstituted phenyl monocyclic phenols, and unsubstituted lower-alkylated monocyclic phenols, in combination with (2) a stabilizing amount of the condensation product of octyl cresol with ethylene oxide.

References Cited in the file of this patent

UNITED STATES PATENTS

| | | |
|---|---|---|
| 2,330,217 | Hunn | Sept. 28, 1943 |
| 2,415,069 | Arvin et al. | Feb. 4, 1947 |
| 2,476,554 | Lincoln et al. | July 19, 1949 |
| 2,499,236 | Van Gilder et al. | Feb. 28, 1950 |
| 2,504,064 | Bock et al. | Apr. 11, 1950 |
| 2,538,355 | Davis et al. | Jan. 16, 1951 |
| 2,678,302 | Beaver et al. | May 11, 1954 |
| 2,773,100 | Stewart | Dec. 4, 1956 |
| 2,790,834 | Morton et al. | Apr. 30, 1957 |
| 2,796,445 | Sullivan | June 18, 1957 |
| 2,863,927 | Parisse | Dec. 9, 1958 |
| 2,889,372 | Munro | June 2, 1959 |

FOREIGN PATENTS

| | | |
|---|---|---|
| 711,122 | Great Britain | June 23, 1954 |

OTHER REFERENCES

Schwartz et al.: "Surface Active Agents," pages 202–217 (16 pages). Pub. by Interscience Publishers, Inc., New York (1948).

Schwartz et al.: "Surface Active Agent," pages 151, 152, 156, 158, 159 (5 pages). Pub. by Interscience Publishers, Inc., New York (1949).